United States Patent
Roberts (10) Patent No.: US 10,067,872 B2
(45) Date of Patent: Sep. 4, 2018

(54) MEMORY SPECULATION FOR MULTIPLE MEMORIES

(71) Applicant: Advanced Micro Devices, Inc., Sunnyvale, CA (US)

(72) Inventor: David A. Roberts, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 10 days.

(21) Appl. No.: 14/746,610

(22) Filed: Jun. 22, 2015

(65) Prior Publication Data

US 2016/0371187 A1 Dec. 22, 2016

(51) Int. Cl.
| | |
|---|---|
| *G06F 12/00* | (2006.01) |
| *G06F 13/00* | (2006.01) |
| *G06F 13/28* | (2006.01) |
| *G06F 9/26* | (2006.01) |
| *G06F 9/34* | (2018.01) |
| *G06F 12/0862* | (2016.01) |
| *G06F 12/0831* | (2016.01) |
| *G06F 12/06* | (2006.01) |
| *G06F 12/0811* | (2016.01) |

(52) U.S. Cl.
CPC ...... *G06F 12/0862* (2013.01); *G06F 12/0638* (2013.01); *G06F 12/0811* (2013.01); *G06F 12/0835* (2013.01); *G06F 2212/1016* (2013.01); *G06F 2212/205* (2013.01); *G06F 2212/502* (2013.01); *G06F 2212/602* (2013.01); *G06F 2212/6022* (2013.01); *G06F 2212/6024* (2013.01); *G06F 2212/6026* (2013.01); *G06F 2212/6028* (2013.01); *G06F 2212/621* (2013.01)

(58) Field of Classification Search
CPC ............. G06F 12/0862; G06F 12/0638; G06F 12/0835; G06F 2212/205; G06F 2212/602; G06F 2212/6022; G06F 2212/6024; G06F 2212/6026; G06F 2212/6028; G06F 2212/621; G06F 12/0811; G06F 2212/502; G06F 2212/1016; G11C 7/1072
USPC ................................. 711/137, 146, 118, 213
See application file for complete search history.

(56) References Cited

U.S. PATENT DOCUMENTS

| | | | | |
|---|---|---|---|---|
| 2007/0038808 | A1* | 2/2007 | Yim | ..................... G06F 12/0246 711/120 |
| 2012/0317364 | A1* | 12/2012 | Loh | ..................... G06F 12/0862 711/137 |
| 2013/0238861 | A1* | 9/2013 | Manne | ................ G06F 12/0862 711/137 |

OTHER PUBLICATIONS

Lee et al., Improving Memory Bank-Level Parallelism in the Presence of Prefetching. Dec. 12-16, 2009, ACM, 42nd Annual IEEE/ACM International Symposium on Microarchitecture, 327-336.*

Eiman Ebrahimi, Onur Mutlu, Chang Joo Lee, and Yale N. Patt "Coordinated control of multiple prefetchers in multi-core systems" In Proceedings of the 42nd Annual IEEE/ACM International Symposium on Microarchitecture (MICRO 42), 2009, 11 pages.

* cited by examiner

Primary Examiner — Shane Woolwine (57) ABSTRACT

A plurality of memory modules, which may be used to form a heterogeneous memory system, are connected to a plurality of prefetchers. Each prefetcher is independently configured to prefetch information from a corresponding one of the plurality of memory modules in response to feedback from the corresponding one of the plurality of memory modules.

19 Claims, 4 Drawing Sheets

MEMORY SPECULATION FOR MULTIPLE MEMORIES

BACKGROUND

Field of the Disclosure

The present disclosure relates generally to processing systems and, more particularly, to memory speculation in processing systems.

Description of the Related Art

Heterogeneous memory structures can be used to balance competing demands for high memory capacity, high speed memory access, high bandwidth, and low cost in processing systems ranging from mobile devices to cloud servers. A heterogeneous memory structure includes multiple memory modules (such as random access memories, RAM) that operate according to different memory access protocols. The memory modules share the same physical address space, which may be mapped to a corresponding virtual address range, so that the different memory modules are transparent to the operating system of the device that includes the heterogeneous memory system structure. For example, a heterogeneous memory system structure may include relatively fast (but high-cost) stacked dynamic RAM (DRAM) and relatively slow (but lower-cost) nonvolatile RAM (NVRAM) that are mapped to a single virtual address range.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Speculation may be used to improve the performance of a processing system by prefetching data from memory (such as a heterogeneous memory system structure) into a cache in the expectation that a processor will subsequently request the prefetched data from the cache. However, the speculation accuracy of the prefetcher depends on the predictability of the memory requests, which may be different for traffic streams directed towards the memory modules that make up the heterogeneous memory system. Failing to account for these differences may reduce the speculation accuracy and diminish, or even reverse, the expected performance gains of speculative prefetching. The performance of a processing system may be improved by dynamically configuring a plurality of prefetchers to issue prefetch requests to a corresponding plurality of memory modules, which may be memory modules that make up a heterogeneous memory system. The plurality of prefetchers is configured based on feedback from a plurality of memory controllers associated with the plurality of memory modules. The feedback may include information indicating latency, prefetch hit rate, memory row buffer hit rate, number of bank conflicts, power consumption, or a number of read or write accesses to the memory module, which may be referred to as an age of the corresponding memory module.

Some embodiments of the prefetchers are dynamically configured in response to changes in the feedback provided by the corresponding memory module(s). For example, the aggressiveness of a stride prefetcher can be increased by increasing the distance or degree of prefetching or increasing a bandwidth cap for prefetch requests in response to feedback indicating a decrease in latency, increases in the prefetch hit rate or the memory row buffer hit rate, a reduction in the number of bank conflicts, or decreased power consumption. Local threshold units may generate control signals that indicate configurations of the prefetchers in response to the feedback provided by the memory controllers. The control signals generated by the local threshold units may be provided to a global threshold unit that generates control signals for the prefetchers based on the control signals received from the local threshold units and one or more global performance parameters. The global performance parameters may include a total bandwidth available to the heterogeneous memory system, an energy budget or capacity, bandwidth allocated to the heterogeneous memory system for memory module, and the like.

Figure 1:
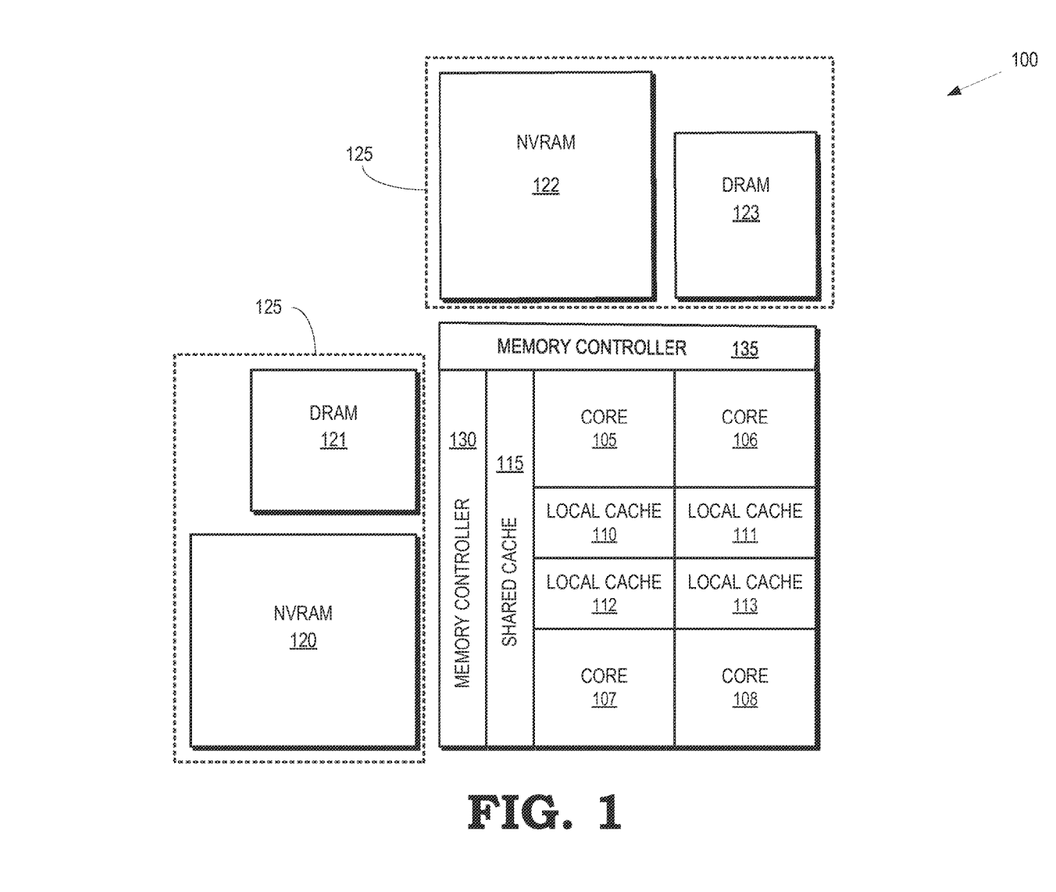
FIG. 1 is a block diagram of a processing system in accordance with some embodiments.

FIG. 1 is a block diagram of a processing system 100 in accordance with some embodiments. The processing system 100 includes multiple processor cores 105, 106, 107, 108 that are referred to collectively as the "processor cores 105-108." The processor cores 105-108 can independently execute instructions concurrently or in parallel. The processing system 100 shown in FIG. 1 includes four processor cores 105-108. However, some embodiments of the processing system 100 may include more or fewer than the four processor cores 105-108 shown in FIG. 1. Some embodiments of the processing system 100 may be formed on a single substrate, e.g., as a system-on-a-chip (SOC). The processing system 100 may be used to implement a central processing unit (CPU), a graphics processing unit (GPU), or an accelerated processing unit (APU) that integrates CPU and GPU functionality in a single chip.

The processing system 100 implements caching of data and instructions, and some embodiments of the processing system 100 may therefore implement a hierarchical cache system. Some embodiments of the processing system 100 include local caches 110, 111, 112, 113 that are referred to collectively as the "local caches 110-113." Each of the processor cores 105-108 is associated with a corresponding one of the local caches 110-113. For example, the local caches 110-113 may be L1 caches for caching instructions or data that may be accessed by one or more of the processor cores 105-108. Some embodiments of the local caches 110-113 may be subdivided into an instruction cache and a data cache. The processing system 100 also includes a shared cache 115 that is shared by the processor cores 105-108 and the local caches 110-113. The shared cache 115 may be referred to as a last level cache (LLC) if it is the highest level cache in the cache hierarchy implemented by the processing system 100. Some embodiments of the shared cache 115 are implemented as an L2 cache. The cache hierarchy implemented by the processing system 100 is not limited to the two level cache hierarchy shown in FIG. 1. Some embodiments of the hierarchical cache system include additional cache levels such as an L3 cache, an L4 cache, or other cache depending on the number of levels in the cache hierarchy.

The processing system 100 also includes a plurality of memory module 120, 121, 122, 123, which may be referred to collectively as "the memory modules 120-123." Although for memory modules 120-123 are shown in FIG. 1, some embodiments of the processing system 100 may include more or fewer memory modules 120-123. Some embodiments of the memory modules 120-123 are used to implement a heterogeneous memory system 125. For example, the plurality of memory modules 120-123 can share a physical address space associated with the heterogeneous memory system 125 so that memory locations in the memory modules 120-123 are accessed using a continuous set of physical addresses. The memory modules 120-103 may therefore be transparent to the operating system of the processing system 100, e.g., the operating system may be unaware that the heterogeneous memory system 125 is made up of more than one memory modules 120-123. In some embodiments, the physical address space of the heterogeneous memory system 125 may be mapped to one or more virtual address spaces.

The memory modules 120-123 may operate according to different memory access protocols. For example, the memory modules 120, 122 may be nonvolatile RAM (NVRAM) that operate according to a first memory access protocol and the memory modules 121, 123 may be dynamic RAM (DRAM) that operate according to a second memory access protocol that is different than the first memory access protocol. Memory requests to the memory modules 120, 122 are therefore provided in a different format than memory requests to the memory modules 121, 123.

The memory modules 120-123 may also have different memory access characteristics. For example, the length of the memory rows in the memory modules 120, 122 may differ from the length of the memory rows in the memory modules 121, 123. The memory modules 120-123 may include row buffers that hold information fetched from rows within the memory modules 120-123 before providing the information to the processor cores 105-108, the local caches 110-113, or the shared cache 115. The sizes of the row buffers may differ due to the differences in the length of the memory rows in the memory modules 120-123. The memory modules 120-123 may also have different memory request latencies, different levels of memory request concurrency, different bandwidths, and the like.

The data that is mapped to memory locations in the memory modules 120-123 may have different spatial characteristics or temporal characteristics, at least in part because of the operating system software mapping different data objects to the most appropriate memory types, resulting in different memory access patterns for the memory modules 120-123. As discussed herein, the effectiveness of speculative prefetching may be reduced and, in some cases, speculation may lead to worse performance than non-speculative operation if the different spatial or temporal characteristics of the address streams directed to memory modules 120-123 are not taken into account. One or more memory controllers 130, 135 are therefore configured to support dynamic prefetching using a plurality of prefetchers that are associated with the memory modules 120-123. The prefetchers are configured based on feedback from the memory controllers 130, 135 and the prefetchers may be dynamically configured in response to changes in the feedback provided by the corresponding memory modules 120-123. The prefetchers are configured independently so that each prefetcher can be configured based upon the characteristics of its associated memory and the feedback generated by its associated memory. In some embodiments, the prefetchers can also be configured based on global parameters such as a total bandwidth available to the heterogeneous memory system 125, an energy budget or capacity of the processing system, or a bandwidth of a shared channel allocated to the memory modules 120-123.

Figure 2:
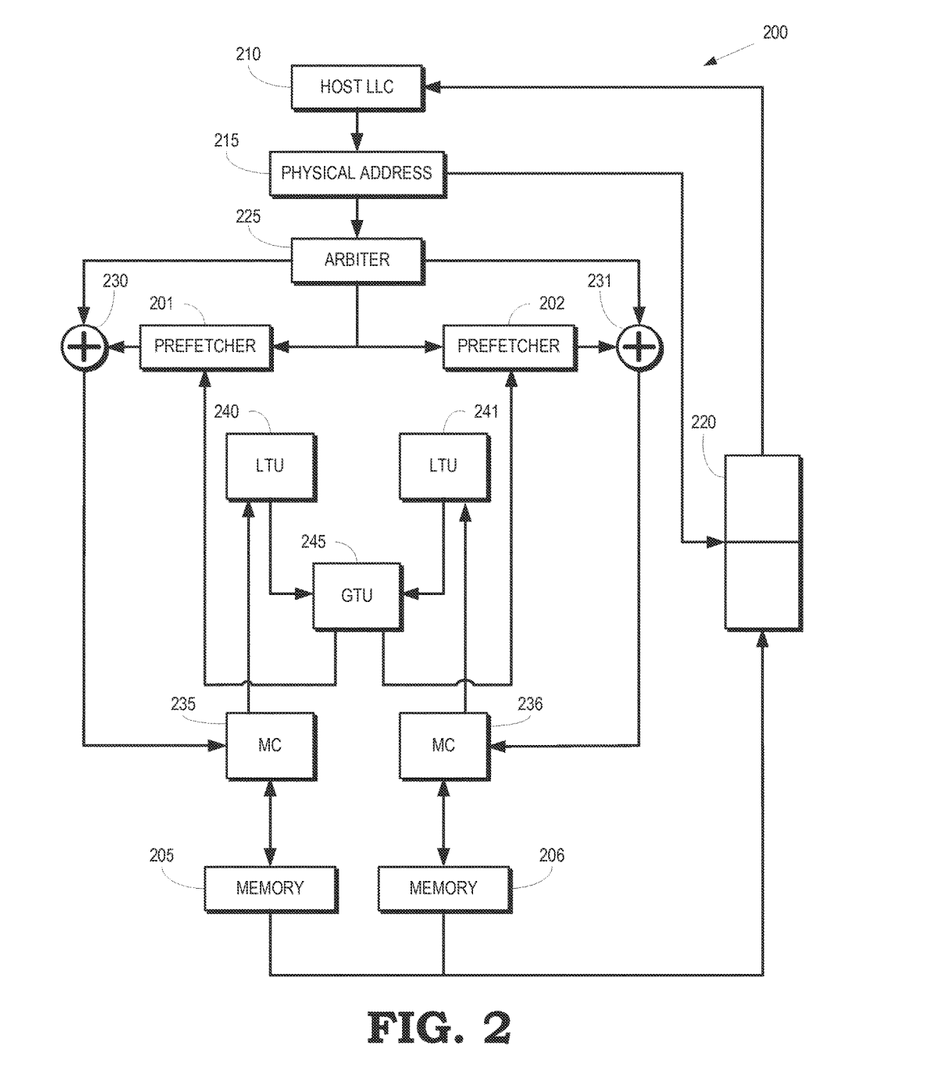
FIG. 2 is a block diagram of a portion of a processing system that includes multiple prefetchers to prefetch information from corresponding memory units according to some embodiments.

FIG. 2 is a block diagram of a portion 200 of a processing system that includes multiple prefetchers to prefetch information from corresponding memory units according to some embodiments. The portion 200 includes two prefetchers 201, 202 that are configured independently in response to feedback generated based on the state of the corresponding memory units 205, 206. In some embodiments, the memory units 205, 206 are memory modules that may be part of a heterogeneous memory system, such as the memory modules 120-123 in the heterogeneous memory system 125 shown in FIG. 1. Although FIG. 2 illustrates two prefetchers 201, 202 for prefetching data from two memory units 205, 206, some embodiments of the portion 200 of the processing system may include more prefetchers for prefetching data from more memory units. Furthermore, the association between prefetchers and memory units may not necessarily be a one-to-one association. In some embodiments, each prefetcher may be associated with more than one physical memory unit. For example, a single prefetcher may be used to prefetch information from the individual NVRAM 120, 122 in response to cache misses in the shared cache 115 that correspond to addresses in the individual NVRAM 120, 122. A second prefetcher may be used to prefetch information from the DRAM 121, 123 in response to cache misses in the shared cache 115 that correspond to addresses in the individual DRAM 121, 123.

The portion 200 of the processing system includes a host last level cache (LLC) 210 that corresponds to the highest level cache in the processing system. Some embodiments of the host LLC 210 correspond to the shared cache 115 shown in FIG. 1. The host LLC 210 may be implemented as an L2 cache or a higher layer cache such as an L3 cache or an L4 cache depending on the number of levels in the cache hierarchy of the processing system. The host LLC 210 provides memory requests to a physical address block 215 in response to cache misses at the host LLC 210. For example, the shared cache 115 shown in FIG. 1 may provide a memory request to the physical address block 215 in response to a cache miss for a memory request from one of the local caches 110-113 shown in FIG. 1. The memory requests may include a virtual address indicating a location of the requested information in the memory units 205, 206. The physical address block 215 may therefore translate or map the virtual address to the physical address of the location of the requested information in the memory units 205, 206.

A prefetch buffer 220 is used to store information that has been retrieved from the memory units 205, 206. The prefetch buffer 220 may be implemented as a single entity or separate prefetch buffers 220 may be implemented for the corresponding memory units 205, 206. The prefetch buffer 220 may also be divided into multiple memory banks to improve scalability. Some embodiments of the prefetch buffer 220 store the information located in physical rows of the memory units 205, 206 that include the physical address of the location of the requested information. Thus, subsequent memory requests to other physical addresses in the same physical row as a previous memory request may also be satisfied using information stored in the prefetch buffer 220 in response to the previous memory request. Previous ("inflight") prefetch requests may also result in the requested information being available in the prefetch buffer 220. The physical address block 215 may therefore use the physical address to determine whether the requested information has been prefetched from one of the memory units 205, 206 and stored in the prefetch buffer 220.

An arbiter 225 receives the physical address in the memory request from the physical address block 215. The arbiter 225 uses the physical address to determine whether the memory request is requesting information from a location in the memory unit 205 or the memory unit 206. The arbiter 225 then selectively directs the memory request to the memory unit 205 or the memory unit 206 depending on the physical address. The arbiter 225 also selectively directs the memory requests to the prefetcher 201 associated with the memory 205 or the prefetcher 202 associated with the memory 206 depending on the physical address. Some embodiments of the arbiter 225 direct the memory requests in response to the physical address block 215 determining that the requested information is not in the prefetch buffer 220. Some embodiments of the arbiter 225 direct the memory requests concurrently with the physical address block 215 determining whether the requested information is available in the prefetch buffer 220. The portion 200 of the processing system may therefore include additional circuitry or logic to cancel memory requests if the physical address block 215 determines that the requested information is available in the prefetch buffer 220.

The prefetchers 201, 202 issue prefetch requests to the corresponding memory units 205, 206 in response to the memory requests received from the arbiter 225. The prefetch requests are issued based on parameters that can be dynamically configured, as discussed below. Combiners 230, 231 combine the memory requests received from the arbiter 225 with the prefetch memory requests received from the corresponding prefetchers 201, 202 to form single streams of memory requests that are provided to corresponding memory controllers (MC) 235, 236. Each memory controller 235, 236 provides its memory requests to the corresponding memories 205, 206, which may retrieve information from the location indicated by the physical address and provide the retrieved information to the prefetch buffer 220 or, in some embodiments, to the host LLC 210. In some embodiments, the memory controllers 235, 236 may be implemented in a single physical entity that may be referred to as a memory controller.

Local threshold units 240, 241 generate information that is used to configure corresponding prefetchers 201, 202 based on feedback received from the corresponding memory controllers 235, 236. Each local threshold unit 240, 241 receives feedback (or inputs) from the corresponding memory controller 235, 236 and then generates signals (or outputs) that can be used to indicate configurations for the corresponding prefetchers 201, 202. Configuration parameters may include a prefetch bandwidth cap that indicates a maximum prefetch bandwidth allocated to the corresponding prefetcher 201, 202, a prefetching degree that indicates the number of memory requests that can be issued concurrently by the corresponding prefetcher 201, 202, or a prefetching distance that indicates how far ahead of the demand miss stream the corresponding prefetcher 201, 202 can send prefetch requests. For example, the prefetcher 201 may be configured to issue prefetch requests according to a first memory access protocol associated with the memory 205. The prefetcher 202 may be configured to issue prefetch requests according to a second (different than the first) memory access protocol associated with the memory 206.

The prefetchers 201, 202 may issue the prefetch requests based on different prefetch bandwidth caps, prefetch degrees, or prefetching distances based on different feedback received from the memories 205, 206 such as different latencies, hit rates, or other feedback parameters discussed herein.

Some embodiments of the local threshold units 240, 241 generate the output signals based on a look up table. Table 1 may be implemented in the local threshold unit 240. The inputs are latency of the corresponding memory unit 205 and a prefetcher hit rate determined based on prefetch requests from the prefetcher 201 to the corresponding memory unit 205. Table 1 indicates threshold values for the latency and the prefetcher hit rate. The local threshold unit 240 compares the input values of latency and prefetcher hit rate to the threshold values. For example, the local threshold unit 240 determines whether the prefetcher hit rate exceeds 50%. If not, the local threshold unit 240 generates output signals indicating a prefetch bandwidth cap of 0, a distance of 0, and a degree of 0, i.e. the local threshold unit 240 generates output signals that turn off prefetching by the prefetcher 201 due to the low prefetcher hit rate.

If the prefetcher hit rate exceeds 50%, the local threshold unit 240 compares the memory latency to the first threshold. If the latency is less than 500 ns, the local threshold unit 240 generates output signals indicating a prefetch bandwidth cap of 64 GB/s, a distance of 4, and a degree of 4, i.e. the local threshold unit 240 generates output signals that indicate aggressive prefetching. If the latency is greater than 500 ns but less than 1000 ns, the local threshold unit 240 generates output signals indicating a prefetch bandwidth cap of 32 GB/s, a distance of 2, and a degree of 2, i.e. the local threshold unit 240 generates output signals that indicate moderately aggressive prefetching. If the latency is greater than 1000 ns, the local threshold units 240 generates output signals indicating a prefetch bandwidth cap of 16 GB/s, a distance of 2, and a degree of 2, i.e. the local threshold unit 240 generates output signals that indicate less aggressive prefetching.

TABLE 1

| Inputs | | Outputs | | |
| --- | --- | --- | --- | --- |
| Threshold1 (e.g. latency) | Threshold2 (e.g. prefetcher hit rate) | Prefetch Bandwidth cap (GB/s) | distance | degree |
| * | 50% | 0 | 0 | 0 |
| 500 ns | * | 64 | 4 | 4 |
| 1,000 ns | * | 32 | 2 | 2 |
| * | * | 16 | 2 | 2 |

Some embodiments of the local threshold units 240, 241 may receive feedback indicative of other input parameters in addition to or instead of memory latency and prefetcher hit rate. For example, the local threshold units 240, 241 may receive feedback representative of a nonvolatile memory latency, which typically increases with age of the corresponding memory unit 205, 206. The nonvolatile memory latency may also increase as the number of read/write cycles increase due to wear out of the memory cells. The prefetch bandwidth can be dynamically throttled (e.g., reduced) based on age or wear out to achieve a target lifetime for the memory as a function of demand or prefetch bandwidth. For another example, the local threshold units 240, 241 may receive feedback representative of a local neighborhood nonvolatile memory error rate that is determined based on read-disturb errors caused at a memory location by read requests to neighboring memory locations. Throttling prefetches to physical addresses or physical regions in the memory based on the local neighborhood nonvolatile memory error rate can reduce localized errors. For yet another example, the local threshold units 240, 241 may receive feedback representative of an energy budget or power consumption of the corresponding memory units 205, 206. Prefetching may then be throttled based on the energy budget or power consumption, e.g., to satisfy the energy budget of the processing system or to increase or decrease power consumption.

Some embodiments of the local threshold units 240, 241 may generate output signals representative of other parameters in addition to or instead of the prefetch bandwidth cap, prefetching distance, or prefetching degree. For example, a bandwidth throttle output parameter may be used to indicate a limit on a number of requests per second, which may be determined using clock cycles and a prefetch counter that counts the number of prefetches within a predetermined time interval. For another example, prefetch distances for the local threshold units 240, 241 may be determined based on the row buffer size for corresponding memory units 205, 206 so that the prefetchers 201, 202 only fetch to the end of the row buffer that includes the requested address. Additionally, the prefetchers 201, 202 may be configured so that they only prefetch compressed blocks or only prefetch during low utilization phases of the memory units 205, 206.

The local threshold units 240, 241 may implement different lookup tables to determine output signals that are used to configure the corresponding prefetchers 201, 202. The input signals, output signals, or threshold values may be the same or different for the different local threshold units 240, 241. For example, different memory types such as DRAM and NVRAM may have significantly different characteristics and consequently prefetching may be controlled on the basis of different parameter values for the different memory types. The tables in the local threshold units 240, 241 can be populated off-line based on application profiling and experimentation. The lookup tables may also be populated by iteratively adjusting the threshold values at run time and observing the performance impact of the adjustments. Moreover, instead of lookup tables, some embodiments of the local threshold units 240, 241 may use other techniques such as algorithms implemented in microcode to determine the outputs as a function of the inputs.

The local threshold units 240, 241 provide the output signals to a global threshold unit 245 that provides control signals to the prefetchers 201, 202. The global threshold unit 245 may generate the control signals in response to the output signals received from the local threshold units 240, 241. The control signals may be substantially the same as the output signals received from the local threshold units 240, 241, may be modified versions or combinations of the output signals received from the local threshold units 240, 241, or may include additional signals that represent information that is not represented in the output signals received from the local threshold units 240, 241. Some embodiments of the global threshold unit 245 generate the control signals based on rules associated with global memory performance. For example, the control signals may be determined based on a global or total bandwidth associated with the processing system, a global energy capacity of the processing system, or bandwidths of shared channels such as the buses that feed the memory units 205, 206. The bandwidths of the shared channels may be represented as ratios of allowed bandwidths for different memory types.

Figure 3:
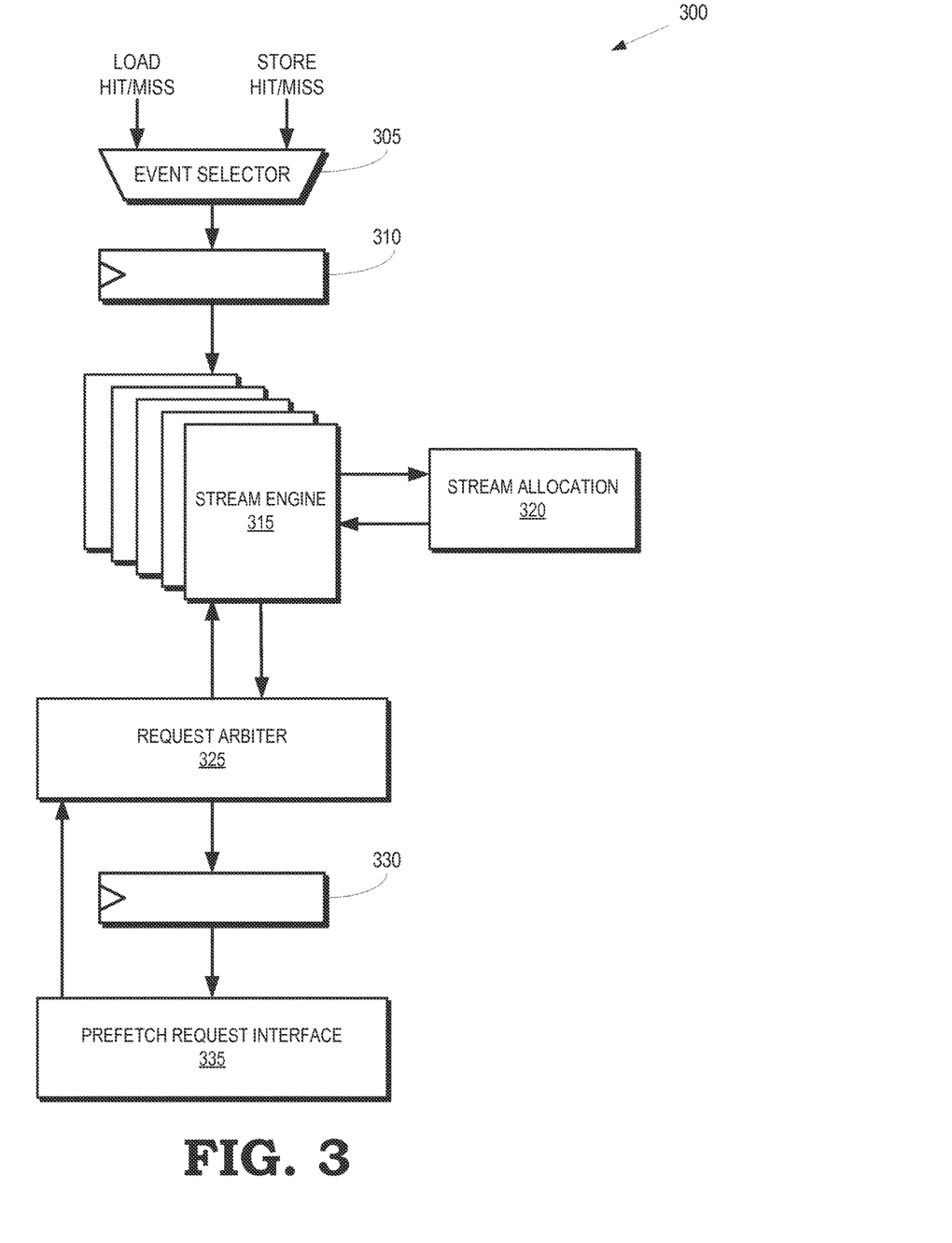
FIG. 3 is a block diagram of a stream prefetcher according to some embodiments.

FIG. 3 is a block diagram of a prefetcher 300 according to some embodiments. The prefetcher 300 may be used to implement some embodiments of the prefetchers 201, 202 shown in FIG. 2. The prefetcher 300 receives signals indicating events related to memory access requests such as hits or misses associated with a load instruction, hits or misses associated with a store instruction, and the like. Miss address buffer (MAB) events, such as hit or miss events for loads or stores, are received or accessed by an event selector block 305, which is used to select events that are to be passed to other stages of the prefetcher 300. For example, the highest priority event may be stored in the registers 310 until they are passed to one or more stream engines 315 and a stream allocation unit 320, e.g., during a subsequent clock cycle. The priority of events can be determined using a hierarchy such as giving the highest priority to load misses and then assigning successively lower priorities to store misses, load hits, and store hits.

The prefetcher 300 includes one or more stream engines 315 that can be used to manage separate prefetch streams. The stream engines 315 may provide a signal to the stream allocation unit 320 to indicate that the current event either hit or missed the stream managed by the stream engine 315. If none of the existing streams indicates a hit for the MAB miss event, then the stream allocation unit 320 can allocate a new stream to a different stream engine 315 using the current event information. When a stream is first allocated, the stream engine 315 sets a page address and an offset value to the current event cache line address. The stream engine 315 can then monitor further MAB events to detect events at addresses adjacent to the current event cache line address in either direction. For example, if the current event cache line address is set to A, then the stream engine 315 looks for events at addresses in relation to the current event cache line address, e.g., addresses A+1 or A−1 for a stride of 1. If the stream engine 315 sees one of the addresses, it defines a stream in the appropriate direction (positive for A+1 and negative for A−1) and trains a new prefetch stream. Some embodiments of the stream engine 315 may also predict a stride that indicates an increment for successive requests in the new prefetch stream.

The prefetcher 300 also includes a request arbiter 325 that is used to arbitrate prefetch requests from the stream engines 315. The request arbiter 325 may be a rotating priority arbiter, but other types of request arbiter 325 may alternatively be implemented in the prefetcher 300. Requests can be transferred from the request arbiter 325 to a register 330 so that the request information can be provided to a prefetch request interface 335, e.g., during a subsequent clock cycle. The prefetch request interface 335 can provide feedback to the request arbiter 325, which can be used to select or arbitrate between pending requests from the stream engines 315.

As discussed herein, the prefetcher 300 can be configured based on feedback representative of the state of the corresponding memory. For example, parameters such as a prefetch bandwidth cap, a prefetching distance, a prefetching degree, and the like may be configured and used to control operation of the prefetcher 300.

Figure 4:
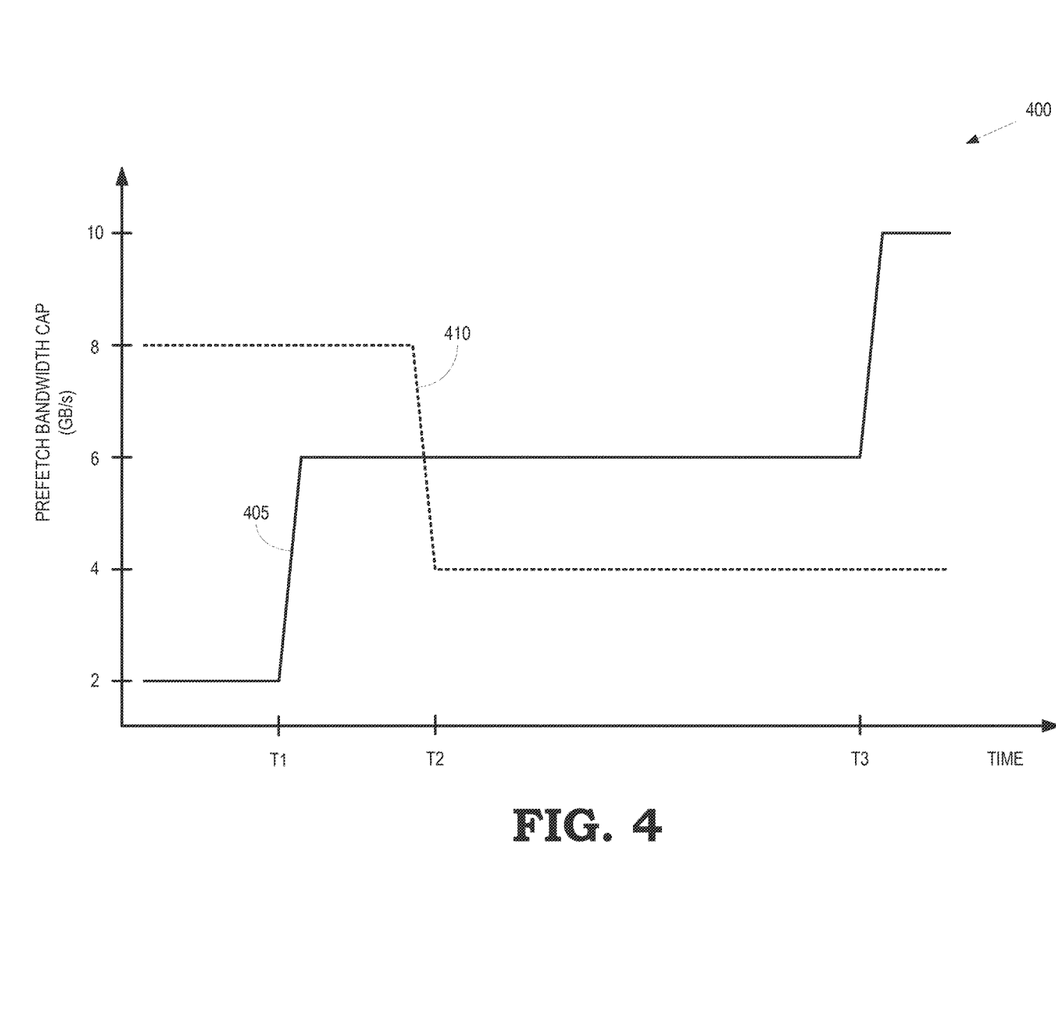
FIG. 4 is a plot of prefetch bandwidth caps for a pair of independently configured prefetchers according to some embodiments.

FIG. 4 is a plot 400 of prefetch bandwidth caps for a pair of independently configured prefetchers according to some embodiments. The vertical axis of the plot 400 indicates the prefetch bandwidth cap in GB/second and the horizontal axis indicates time increasing from left to right. The prefetch bandwidth caps 405, 410 may correspond to prefetch bandwidth caps that are applied to the prefetchers 201, 202 shown in FIG. 2. The prefetch bandwidth caps 405, 410 may be determined by threshold unit such as the local threshold units 240, 241 or the global threshold unit 245 shown in FIG. 2. The plot 400 is intended to illustrate the independent configuration of different prefetchers and not to limit the independent configuration to configuration of the prefetch bandwidth cap. In some embodiments, other parameters such as a prefetch degree or prefetching distance may also be independently configured in addition to or instead of the prefetch bandwidth caps 405, 410 shown in FIG. 4.

Initially, the prefetch bandwidth cap 405 is set to 2 GB/s and the prefetch bandwidth cap 410 is set to 8 GB/s. At time T1, the prefetch bandwidth cap 405 for one of the prefetchers (referred to as the first prefetcher) is increased to 6 GB/s in response to feedback received from the corresponding (first) memory element. For example, the prefetch bandwidth cap 405 may be increased in response to feedback indicating a decrease in latency for memory access requests or prefetch requests to the first memory element. The prefetch bandwidth cap 410 for the other prefetcher (referred to as the second prefetcher) is maintained at 8 GB/s.

At time T2, the prefetch bandwidth cap 410 of the second prefetcher is reduced to 4 GB/s in response to feedback received from the corresponding (second) memory element. For example, the prefetch bandwidth cap 410 may be reduced in response to feedback indicating an increase in latency for memory access requests or prefetch requests to the second memory element. The prefetch bandwidth cap 405 for the first prefetcher is maintained at 6 GB/s.

At time T3, the prefetch bandwidth cap 405 for the first prefetcher is increased to 10 GB/s in response to feedback received from the first memory element. For example, the prefetch bandwidth cap 405 may be increased in response to feedback indicating a decrease in latency for memory access requests or prefetch requests to the first memory element. The prefetch bandwidth cap 410 for the second prefetcher is maintained at 4 GB/s.

In some embodiments, the apparatus and techniques described above are implemented in a system comprising one or more integrated circuit (IC) devices (also referred to as integrated circuit packages or microchips), such as the processing system described above with reference to FIGS. 1-4. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   a heterogeneous memory system including a plurality of main memory modules including at least a first memory type and a second memory type that operate according to different memory access protocols;

at least one memory controller associated with the plurality of main memory modules; and a plurality of prefetchers, wherein each prefetcher is independently configured to prefetch information from a corresponding one of the plurality of main memory modules into a cache memory in response to feedback from the corresponding one of the plurality of main memory modules, the cache memory storing a subset of data stored in the plurality of main memory modules, and wherein the feedback is generated based on information representative of changes in latency of memory requests to the corresponding one of the plurality of main memory modules received by the at least one memory controller from the plurality of main memory modules.

2. The apparatus of claim 1, wherein the plurality of main memory modules share an address space associated with the heterogeneous memory system.

3. The apparatus of claim 1, wherein the plurality of main memory modules includes a dynamic RAM (DRAM) that operates according to a first memory access protocol and a nonvolatile RAM (NVRAM) that operates according to a second memory access protocol.

4. The apparatus of claim 1, wherein the feedback further comprises at least one of information indicating a prefetch hit rate, a memory row buffer hit rate, a number of bank conflicts, a number of memory request errors, a power consumption, or an age of at least one of the plurality of main memory modules.

5. The apparatus of claim 1, further comprising:
a plurality of local threshold units associated with the plurality of prefetchers, wherein each local threshold unit generates first control signals for configuring a corresponding one of the plurality of prefetchers, and wherein the first control signals are generated in response to the feedback.

6. The apparatus of claim 5, further comprising:
a global threshold unit to generate second control signals based on the first control signals and at least one global performance parameter, wherein the global threshold unit provides the second control signals to configure the plurality of prefetchers.

7. The apparatus of claim 6, wherein the at least one global performance parameter comprises at least one of a total bandwidth available to the plurality of main memory modules, an energy budget or capacity, and a bandwidth of a shared channel allocated to the plurality of main memory modules.

8. The apparatus of claim 1, wherein the feedback further comprises at least one of information indicating a nonvolatile memory latency, a local neighborhood nonvolatile memory error rate determined based on read-disturb errors caused by read requests to neighboring memory locations, or an energy budget of at least one of the plurality of main memory modules.

9. A method comprising:
receiving feedback from at least one memory controller associated with a heterogeneous memory system comprising a plurality of main memory modules including at least a first memory type and a second memory type that operate according to different memory access protocols, wherein the feedback is generated based on information representative of changes in latency of memory requests to at least one of the plurality of main memory modules received by the at least one memory controller from the plurality of main memory modules; and independently configuring a plurality of prefetchers so that each of the plurality of prefetchers prefetches information from a corresponding one of the plurality of main memory modules into a cache memory in response to feedback from the corresponding one of the plurality of main memory modules, the cache memory storing a subset of data stored in the plurality of main memory modules.

10. The method of claim 9, wherein independently configuring the plurality of prefetchers comprises prefetching information from the plurality of main memory modules, wherein the plurality of main memory modules share an address space associated with the heterogeneous memory system.

11. The method of claim 9, wherein independently configuring the plurality of prefetchers comprises prefetching information from the corresponding one of the plurality of main memory modules according to a corresponding one of a plurality of memory access protocols.

12. The method of claim 9, wherein the feedback further comprises at least one of information indicating a prefetch hit rate, a memory row buffer hit rate, a number of bank conflicts, a number of memory request errors, power consumption, or age of at least one of the plurality of main memory modules.

13. The method of claim 9, further comprising:
generating first control signals for configuring a corresponding one of the plurality of prefetchers, and wherein the first control signals are generated in response to the feedback at a plurality of local threshold units associated with the plurality of prefetchers.

14. The method of claim 13, further comprising:
generating second control signals based on the first control signals and at least one global performance parameters; and
providing the second control signals to configure the plurality of prefetchers.

15. The method of claim 9, wherein the feedback further comprises at least one of information indicating a nonvolatile memory latency, a local neighborhood nonvolatile memory error rate determined based on read-disturb errors caused by read requests to neighboring memory locations, or an energy budget of at least one of the plurality of main memory modules.

16. A non-transitory computer readable medium embodying a set of executable instructions, the set of executable instructions to manipulate a computer system to perform a portion of a process to fabricate at least part of a processor, the processor comprising:
a plurality of main memory modules of a heterogeneous memory system including at least a first memory type and a second memory type that operate according to different memory access protocols;
at least one memory controller associated with the plurality of main memory modules; and
a plurality of prefetchers, wherein each prefetcher is independently configured to prefetch information from a corresponding one of the plurality of main memory modules into a cache memory in response to feedback from the corresponding one of the plurality of main memory modules, the cache memory storing a subset of data stored in the plurality of main memory modules, and wherein the feedback is generated based on information representative of changes in latency of memory requests to the corresponding one of the plurality of main memory modules received by the at least one memory controller from the plurality of main memory modules.

17. The non-transitory computer readable medium of claim 16, wherein the set of executable instructions is to manipulate the computer system to perform a portion of the process to fabricate the processor, wherein the processor further comprises:
a plurality of local threshold units associated with the plurality of prefetchers, wherein each local threshold unit generates first control signals for configuring a corresponding one of the plurality of prefetchers, and wherein the first control signals are generated in response to the feedback.

18. The non-transitory computer readable medium of claim 17, wherein the set of executable instructions is to manipulate the computer system to perform a portion of the process to fabricate the processor, wherein the processor further comprises:
a global threshold unit to generate second control signals based on the first control signals and at least one global performance parameters, wherein the global threshold unit provides the second control signals to configure the plurality of prefetchers.

19. The non-transitory computer readable medium of claim 16, wherein each prefetcher is independently configured in response to feedback comprising at least one of information indicating a nonvolatile memory latency, a local neighborhood nonvolatile memory error rate determined based on read-disturb errors caused by read requests to neighboring memory locations, or an energy budget of at least one of the plurality of main memory modules.

* * * * *